Figure 1:
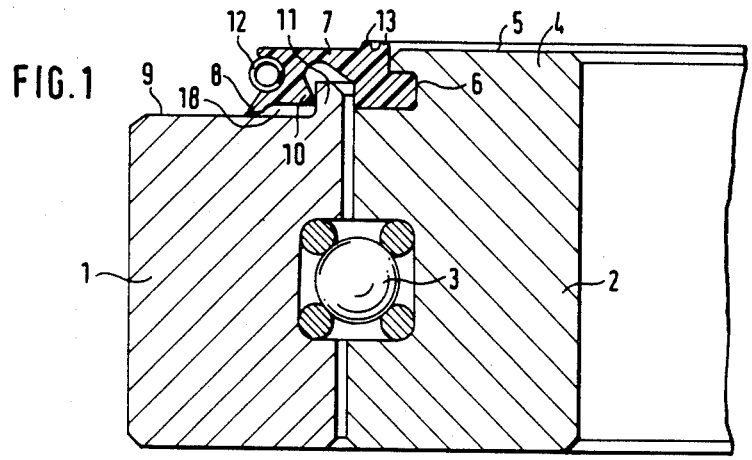

United States Patent [19]

Basener

[11] Patent Number: 4,544,286
[45] Date of Patent: Oct. 1, 1985

[54] BEARING SEAL WITH DUAL SEALING LIPS

[75] Inventor: Helmut Basener, Hochstadt, Fed. Rep. of Germany

[73] Assignee: INA Walzlager Schaeffler KG, Fed. Rep. of Germany

[21] Appl. No.: 703,879

[22] Filed: Feb. 21, 1985

[30] Foreign Application Priority Data

Mar. 9, 1984 [DE] Fed. Rep. of Germany ....... 3408664

[51] Int. Cl.$^4$ .......................... F16J 15/32; F16J 15/34; F16C 33/72
[52] U.S. Cl. ...................................... 384/486; 277/82; 277/84; 277/153; 277/85
[58] Field of Search ............... 277/82, 84, 85, 152, 277/153; 308/187.1, 187.2; 384/481, 482, 486, 607

[56] References Cited

U.S. PATENT DOCUMENTS

| | | | |
|---|---|---|---|
| Re. 24,940 | 2/1961 | Stephens | 277/82 |
| 2,177,441 | 10/1939 | Pesarese | 277/152 |
| 4,402,558 | 9/1983 | Olschewski et al. | 384/486 X |

FOREIGN PATENT DOCUMENTS

| | | | |
|---|---|---|---|
| 1017868 | 10/1957 | Fed. Rep. of Germany | 277/84 |
| 1009094 | 2/1952 | France | 277/82 |
| 580957 | 9/1946 | United Kingdom | 277/82 |
| 1362725 | 8/1974 | United Kingdom | 277/85 |

*Primary Examiner*—Robert S. Ward
*Attorney, Agent, or Firm*—Bierman, Peroff & Muserlian

[57] ABSTRACT

A seal for a rolling bearing rotary joint consisting of two race rings disposed concentrically inside one another and between which rolling members roll, one race ring projecting axially beyond the other race ring and carrying an elastic gasket in this part projecting beyond the other race ring, the gasket being disposed in a peripheral groove which is open towards the other race ring and bearing slidingly against the other race ring, characterized in that the elastic gasket (7) has an axial sealing lip (8) bearing against the end face (9) of the other race ring (1) which has an axially outwardly extending peripheral collar (11) between the point of contact of said sealing lip and its surface facing the one race ring (2), against which peripheral collar (11) there bears a second radially acting sealing lip (10) of the elastic gasket (7).

8 Claims, 3 Drawing Figures

BEARING SEAL WITH DUAL SEALING LIPS

STATE OF THE ART

A seal for a rolling bearing rotary joint consisting of two race rings disposed concentrically inside one another and between which rolling members roll, one race ring projecting axially beyond the other race ring and carrying an elastic gasket in this part projecting beyond the other race ring, the gasket being disposed in a peripheral groove which is open towards the other race ring and bearing slidingly against the other race ring is known. While it is very suitable for sealing against ordinary dust and dirt, it does not offer reliable protection against the penetration of water, and this may not only cause corrosion damage but also jeopardize the slip-ring electrical power supply system often incorporated in a rotary joint.

OBJECTS OF THE INVENTION

It is an object of the invention to improve the known seal with a minimum of constructional outlay so that the penetration of water into the rolling bearing rotary joint is prevented with a high degree of reliability.

This and other objects and advantages of the invention will become obvious from the following detailed description.

THE INVENTION

The novel seal of the invention for a rolling bearing rotary joint consisting of two race rings disposed concentrically inside one another and between which rolling members roll, one race ring projecting axially beyond the other race ring and carrying an elastic gasket in this part projecting beyond the other race ring, the gasket being disposed in a peripheral groove which is open towards the other race ring and bearing slidingly against the other race ring, is characterized in that the elastic gasket (7) has an axial sealing lip (8) bearing against the end face (9) of the other race ring (1) which has an axially outwardly extending peripheral collar (11) between the point of contact of said sealing lip and its surface facing the one race ring (2), against which peripheral collar (11) there bears a second radially acting sealing lip (10) of the elastic gasket (7).

In combination with the radially acting sealing lip, the axially outwardly extending peripheral collar forms an additional barrier to the penetration of water due to the difference in levels requiring to be overcome, particularly if the bearing is installed with the axis of rotation vertical. To insure permanent reliable sealing, the radially acting sealing lip bearing against the peripheral collar may be subject to the action of a spring, more particularly, a worm spring extending over the entire gasket periphery. To increase both the sealing effect further and to reduce wear at the sealing lips, the annular chamber between the two sealing lips may be filled with grease which also obviates rusting at the contact surfaces of the sealing lips and also increases the life of the sealing lips.

In another aspect of the invention, the peripheral groove receiving the elastic gasket is open towards the end face of the one race ring, the elastic gasket is approximately flush with said end face, and at least one concentric peripheral bead projecting beyond said end face is provided on the outer axial face of the gasket in its region covering the one race ring. These peripheral beads perform the function of sealing the rotary joint from an adjoining structure so that it is possible to dispense with additional sealing measures in the form of O-rings or sealant.

To minimize the machining work required in the manufacture of the race ring bearing the axially extending peripheral collar, the latter may be formed by a band inserted into an axially open peripheral groove in the end face of this race ring. In addition, the band may be provided with a radially extending peripheral edge which bears against the end face of the other race ring and which extends radially to an extent such that the axial sealing lip bears against it slidingly. In both cases, the band may be made of polymeric material so that not only is rusting at the contact surface of the radial sealing lip obviated, but friction is also reduced.

Figure 2:
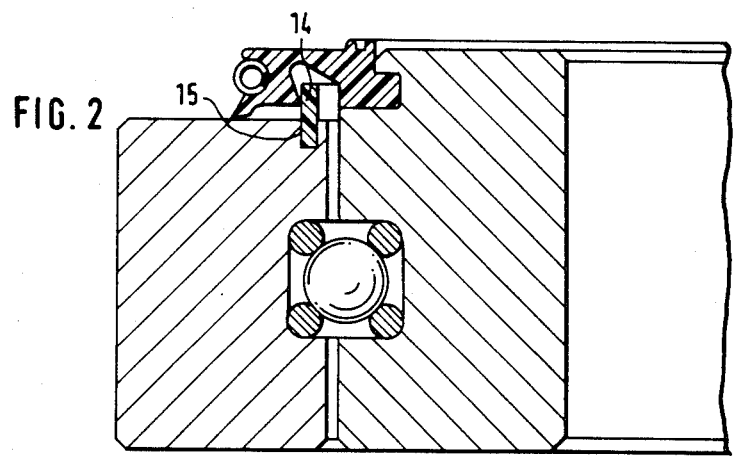
Figure 3:
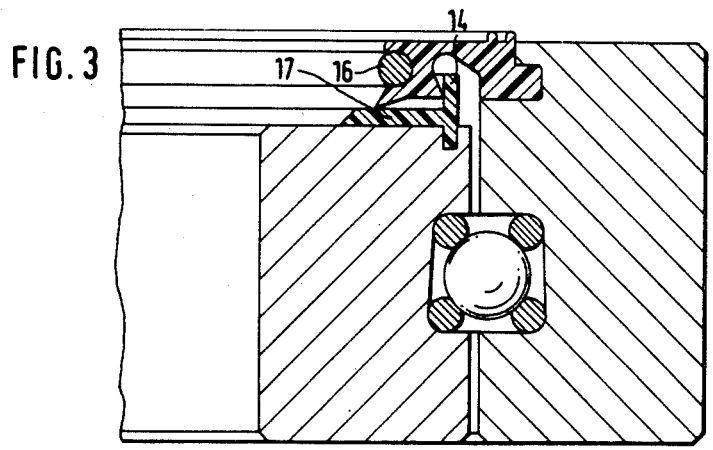

Referring now to the drawings:

FIGS. 1, 2 and 3 are partial longitudinal cross-sections of the different embodiments of seals for a rotary joint.

The rolling bearing rotary joint of FIG. 1 is constructed as a race wire ball bearing in which balls 3 roll on race wires between the outer race ring 1 and the inner race ring 2. The top part 4 of inner race ring 2 projects beyond outer race ring 1 and in this portion has the radial groove 6 which is partially also open axially towards the end face 5 of inner race ring 2. This radial groove receives the elastic gasket 7 which bears slidingly by its axial sealing lip 8 against the end face 9 of outer race ring 1. It additionally has the radial sealing lip 10 which bears against the axially extending peripheral collar 11. Radial sealing lip 10 is subjected to the action of the worm spring 12 which is inserted positively in a peripheral groove of gasket 7. Finally, gasket 7 has two concentric peripheral beads 13 in the region in which radial groove 6 is axially open, said peripheral beads 13 projecting beyond end face 5 of inner race 2 and thus providing a seal against an adjoining structure on which inner race 2 is secured.

The variation of FIG. 2 differs from that of FIG. 1 only in that the peripheral collar against which the radial sealing lip bears is formed by a band 14 made of polymeric material which is inserted into an axially open peripheral groove 15 of outer race ring 1.

Whereas, in the preceding exemplified embodiments, it is always the inner race ring which bears gasket 7 whose sealing lips bear slidingly against the outer race ring, this is reversed in the construction of FIG. 3. Substantially the only effect of this is that a wire ring 16 acting as a compression spring is used in this case instead of worm spring 12. Another difference is that a radial peripheral edge 17 is formed on band 14 made of polymeric material, the axial sealing lip running against said peripheral edge 17.

In all three cases, it is possible for the annular chamber between the two sealing lips which is denoted by 18 in FIG. 1 to be filled with grease.

Various modifications of the seal of the invention may be made without departing from the spirit or scope thereof and it is to be understood that the invention is intended to be limited only as depicted in the appended claims.

What I claim is:

1. A seal for a rolling bearing rotary joint consisting of two race rings disposed concentrically inside one another and between which rolling members roll, one race ring projecting axially beyond the other race ring and carrying an elastic gasket in this part projecting beyond the other race ring, the gasket being disposed in a peripheral groove which is open towards the other race ring and bearing slidingly against the other race ring, characterized in that the elastic gasket (7) has an axial sealing lip (8) bearing against the end face (9) of the other race ring (1) which has an axially outwardly extending peripheral collar (11) between the point of contact of said sealing lip and its surface facing the one race ring (2), against which peripheral collar (11) there bears a second radially acting sealing lip (10) of the elastic gasket (7).

2. A seal of claim 1 wherein the radially acting sealing lip (10) is subject to the action of a spring (12).

3. The seal of claim 2 wherein the spring (12) is a worm spring extending over the entire gasket periphery.

4. A seal of claim 1 or 2 or 3 wherein the annular chamber (18) between the two sealing lips (8, 10) is filled with grease.

5. A seal of claim 1 or 2 or 3 wherein the peripheral groove (6) receiving the elastic gasket (7) is open towards the end face (5) of the one race ring (2), the elastic gasket (7) is approximately flush with said end face (5), and at least one concentric peripheral bead (13) projecting beyond said end face (5) is provided on the outer axial face of the gasket in its region covering the one race ring (2).

6. A seal of claim 1 wherein the radially extending peripheral collar (11) is in the form of a band (14) inserted into an axially open peripheral groove (15) in the end face (9) of the other race ring (1).

7. A seal of claim 6 wherein the band (14) is provided with a radially extending peripheral edge (17) which bears against the end face (9) of the other race ring (1) and which extends radially to an extent such that the axial sealing lip (8) bears against it slidingly.

8. A seal of claim 6 or 7 wherein the band (14) is made of polymeric material.

* * * * *